(12) United States Patent
Jeong

(10) Patent No.: US 7,574,718 B2
(45) Date of Patent: Aug. 11, 2009

(54) TELEVISION HAVING PROGRAM RATING FUNCTION AND REPORTING METHOD THEREOF

(75) Inventor: Jo-Kyun Jeong, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1448 days.

(21) Appl. No.: 10/120,387

(22) Filed: Apr. 12, 2002

(65) Prior Publication Data
US 2003/0023969 A1    Jan. 30, 2003

(30) Foreign Application Priority Data
Jul. 24, 2001    (KR) .............................. 2001-44354

(51) Int. Cl.
H04N 7/16      (2006.01)
H04N 5/44      (2006.01)

(52) U.S. Cl. .............................. 725/28; 725/25; 725/27; 348/725

(58) Field of Classification Search .................... 725/28, 725/25, 41, 45
See application file for complete search history.

(56) References Cited

U.S. PATENT DOCUMENTS 6,020,910 A * 2/2000 Schmidt et al. ............... 725/28
6,230,320 B1 * 5/2001 Gakumura ................... 725/25
6,400,379 B1   6/2002 Johnson et al.
6,799,325 B1 * 9/2004 Shiomi ......................... 725/25
6,944,876 B1 * 9/2005 Whitelaw ..................... 725/25
2003/0149988 A1 * 8/2003 Ellis et al. ...................... 725/87

FOREIGN PATENT DOCUMENTS

WO    WO 97/42759 A1    11/1997

* cited by examiner

Primary Examiner—Christopher Kelley
Assistant Examiner—Usha Raman
(74) Attorney, Agent, or Firm—Sughrue Mion, PLLC

(57) ABSTRACT

A television having a program rating function according to a set-up value of a program rating set up by a user and a method for controlling the same. The television has: a judgment unit for judging the program rating based on a program rating signal included in a received broadcasting signal; a set-up value storage unit for storing the set-up value of a program rating set up by the user; a display unit for displaying the program rating judged by the judgment unit; and a control unit for controlling the display unit to display the program rating judged by the judgment unit, when there is no set-up value in the set-up value storage unit. Therefore, when the programs are broadcasted in a situation in which the user has not set up the set-up value of the program rating due to the inconvenience of a V-chip (Violence-Chip), it is reported to the user that the television includes the above function through a display unit. Accordingly, programs can be watched by a suitable audience and the practical usage of the television having the function of the program rating is improved.

8 Claims, 5 Drawing Sheets

FIG.2

| RATINGS | DEFINITION OF RATINGS |
|---|---|
| TV-Y(Young Children) | PROGRAM SUITABLE FOR ALL CHILDREN |
| TV-Y7(Children 7 and Over) | PROGRAM SUITABLE FOR CHILDREN OVER 7 |
| TV-G(General Audience) | PROGRAM SUITABLE FOR MOST AUDIENCE |
| TV-PG(Parental Guidance) | PROGRAM REQUIRED PARENTAL GUIDANCE |
| TV-14(Viewers 14 and Over) | PROGRAM NOT SUITABLE FOR CHILDREN UNDER 14 |
| TV-MA(Mature Audience) | PROGRAM ONLY FOR MATURE AUDIENCE |

TELEVISION HAVING PROGRAM RATING FUNCTION AND REPORTING METHOD THEREOF

BACKGROUND OF THE INVENTION

1. Field of the Invention

The present invention relates to a television, and more particularly to a television having a V-chip (Violence-chip) for a program rating function and restricting a segment of the audience from watching harmful programs. The present application is based on Korean Patent Application No. 2001-44354, which is incorporated herein by reference.

2. Description of the Related Art

Generally, a television receives RF signals for television broadcasting of a plurality of channels received from a television broadcasting station through an antenna. When a channel is selected, an RF signal of the selected channel is tuned among the RF signals of the received plurality of channels. A video signal and an audio signal are reproduced after a video signal processing and an audio signal processing with respect to the tuned RF signal is performed.

Since television programs are broadcast considering age groups of the audience to get a high popularity rating, children and minors can watch some programs, which might affect them badly if there is no restriction on the programs.

To solve the above problem, a program rating system has been introduced since the early 1960's in the U.S.A., Canada, France, Australia, etc.

Received broadcasting signals include the program rating corresponding to the programs, and a V-chip (Violence-chip) prevents some harmful programs from being watched by children and minors by using the included program rating. The V-chip compares program rating information, such as the program rating included in the broadcasting signals, and a program rating set-up in advance by a user, and blocks a specific program according to the compared result to restrict some segments of the audience from watching harmful programs.

However, although the user buys the television having the program rating function, when the user does not know that the television has a V-chip or the user does not set up the program rating due to the inconvenience of the V-chip, the programs are broadcast without any restrictions. Thus the V-chip, which is expensive to buy and install, becomes a useless thing.

SUMMARY OF THE INVENTION

The present invention has been made to overcome the above-mentioned problem of the related art. Accordingly, it is an object of the present invention to provide a television capable of informing of the fact that the television has a restriction function when the television having a V-chip is not used to restrict some programs for some of the audience.

The television according to the present invention to accomplish the above object comprises: a judgment unit for judging a program rating based on a program rating signal included in a received broadcasting signal; a set-up value storage unit for storing a set-up value of a program rating set up by a user; a display unit for displaying the program rating judged by the judgment unit; and a control unit for controlling the display unit to display the program rating judged by the judgment unit, when there is no set-up value in the set-up value storage unit.

Here, the display unit can be realized as an OSD/OSG (on-screen display/on-screen graphic) generation unit for displaying the program rating as an OSD/OSG screen on a CRT, or as a speaker for informing the program rating by an audible signal. Moreover, it is preferable that the display of the display unit is operated repeatedly at predetermined temporal intervals.

According to the preferred embodiment of the present invention, the television further comprises a program rating classification storage unit for storing a general program rating classification of the broadcasting signal. At this time, the display unit displays the general program rating and the general program rating classification stored in the program rating classification storage unit.

On the other hand, according to the present invention, a method for notifying of an existence of a function of restricting display of specific programming comprises the steps of: judging a program rating of a received broadcasting signal based on a program rating signal included in the broadcasting signal; detecting whether a user has set up a set-up value of the program rating; and displaying the program rating judged in the judging step, when the user has not set up the set-up value.

BRIEF DESCRIPTION OF THE DRAWINGS

The above-mentioned object and the feature of the present invention will be more apparent by describing the preferred embodiments of the present invention by referring to the appended drawings, in which:

FIG. 2 is a view showing program ratings and definitions of the program ratings classification of broadcasting programs in the U.S.A.;

DESCRIPTION OF THE PREFERRED EMBODIMENTS

Hereinbelow, the present invention will be described in detail by referring to the appended drawings.

Figure 1:
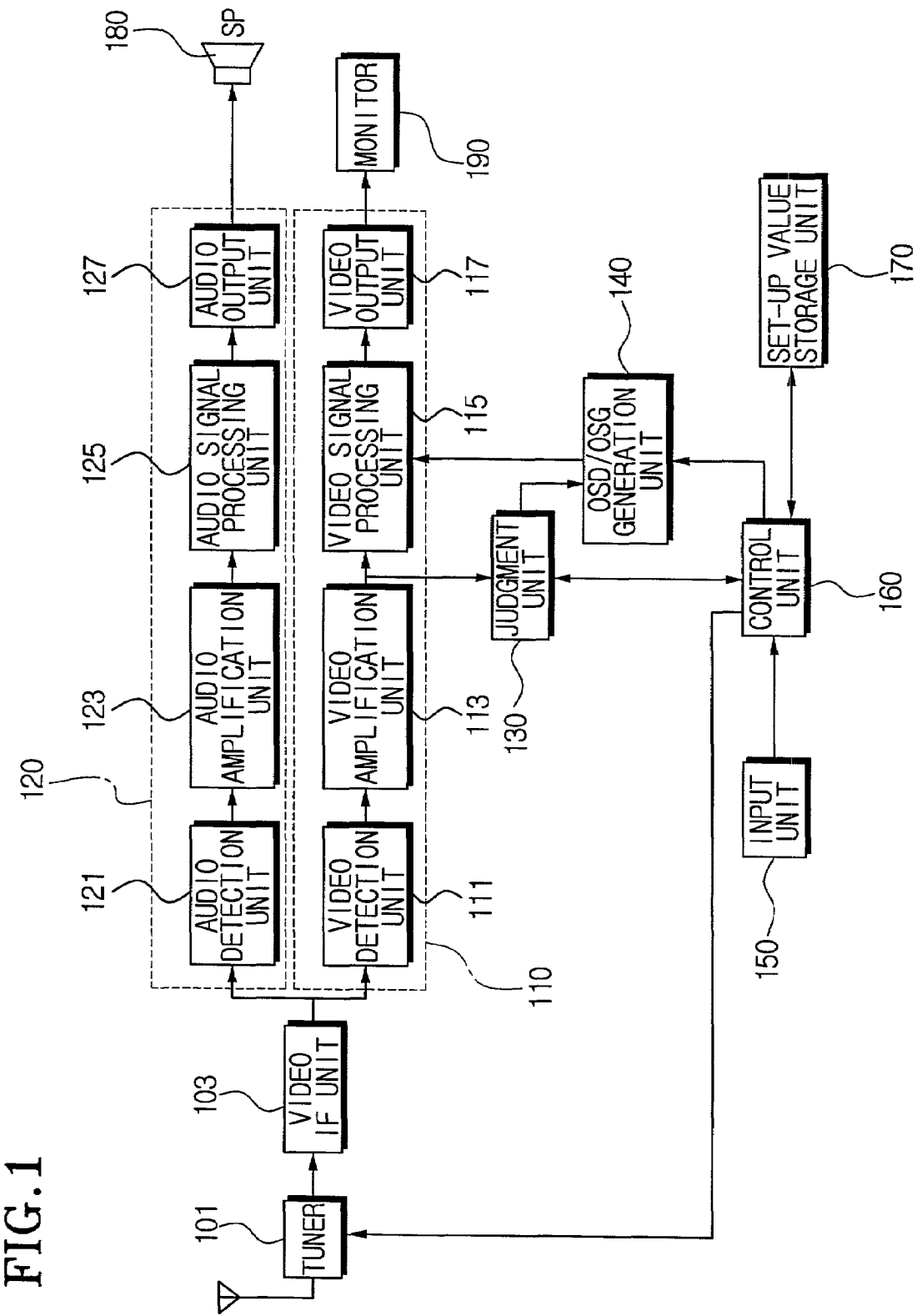
FIG. 1 is a block diagram showing a structure of a television of the first preferred embodiment of the present invention.

FIG. 1 is a block diagram showing a television having a program rating function according to the first preferred embodiment of the present invention.

The television includes a tuner 101, a video IF unit 103, a video circuit 110, an audio circuit 120, a judgment unit 130, an OSD/OSG generation unit 140, a control unit 160, a set-up value storage unit 170, a CRT 190, a speaker 180, and an input unit 150.

The control unit 160 allows band data and channel selection data for tuning a predetermined channel according to a channel selection signal input from the input unit 150 to be input into the tuner 101. The tuner 101 tunes an RF signal of a corresponding channel according to the channel selection data, and converts a local oscillation frequency signal generated by the channel selection data to an intermediate frequency signal by mixing the local oscillation frequency signal with the RF signal of the tuned broadcasting signal. The video IF unit 103 separates a video intermediate frequency signal from the intermediate frequency signal of a broadcasting signal converted in the tuner 101.

The video circuit 110 includes a video detection unit 111, a video amplification unit 113, a video signal processing unit 115, and a video output unit 117. The video detection unit 111 detects a video signal from the video intermediate frequency signal. The video amplification unit 113 amplifies the detected video signal, and distributes the video signal to a synchronizing circuit (not shown) or an amplification circuit (not shown). The video amplification unit 113 also interpolates a transfer time of a color difference signal and a luminance signal, and compensates for a characteristic of an intermediate frequency and a high frequency. The video signal processing unit 115 separates the color difference signal and the luminance signal from the video signal amplified in the video amplification unit 113, and operates a luminance adjustment and color demodulation. Moreover, the video signal processing unit 115 outputs a rating after mixing the rating according to program rating data from the OSD/OSG generation unit 140 with a composite video signal. The video output unit 117 generates a vertical/horizontal driving signal for driving a vertical/horizontal deflection coil of a monitor.

The audio circuit 120 comprises an audio detection unit 121, an audio amplification unit 123, an audio signal processing unit 125, and an audio output unit 127. The audio detection unit 121 detects an audio intermediate frequency signal from the broadcasting signal amplified to the intermediate frequency in the video IF unit 103 through a detection operation. The audio amplification unit 123 amplifies the audio signal amplified to the intermediate frequency in the audio detection unit 121 to a signal level that allows the audio signal to be processed. The audio signal processing unit 125 outputs the amplified audio signal after adjusting the amount of the audio signal and the quality of the audio signal, and processing a multi-channel audio and stereo signal. The audio output unit 127 outputs the audio signal to the speaker 180 after amplifying the audio signal.

The judgment unit 130 judges the program rating data from the video signal input from the video amplification unit 113, and outputs the judged rating to the OSD/OSG generation unit 140 and the control unit 160.

The set-up value storage unit 170 stores a set-up value of the program rating set up by a user. In other words, referring to a program rating classification of the USA shown in FIG. 2, the user stores one of the program ratings such as 'TV-Y', 'TV-Y7', 'TV-G', 'TV-PG', 'TV-14', and 'TV-MA'into the set-up value storage unit 170 through the input unit 150.

The control unit 160 judges whether the set-up value is stored in the set-up value storage unit 170. When the control unit 160 judges that there is the set-up value of the program rating stored in the set-up value storage unit 170, the control unit 160 compares the rating judged by the judgment unit 130 and the set-up value stored in the set-up value storage unit 170. When the judged rating is lower than the set-up value, then the program is blocked. When the judged rating is higher than the set-up value, then the program is broadcasted.

When the control unit 160 judges that there is no set-up value of the rating stored in the set-up value storage unit 170, the control unit 160 outputs the judged rating to the OSD/OSG generation unit 140. Then, the OSD/OSG generation unit 140 converts the judged rating to an OSD/OSG screen, and outputs the OSD/OSG screen to the video signal processing unit 115. At this time, the control unit 160 controls the judged rating to be repeatedly displayed on the CRT 190 at predetermined temporal intervals.

On the other hand, the control unit 160 can repeatedly output the judged rating through the speaker 180 at the predetermined temporal intervals by outputting a predetermined audio signal to the audio signal processing unit 125.

Figure 3:
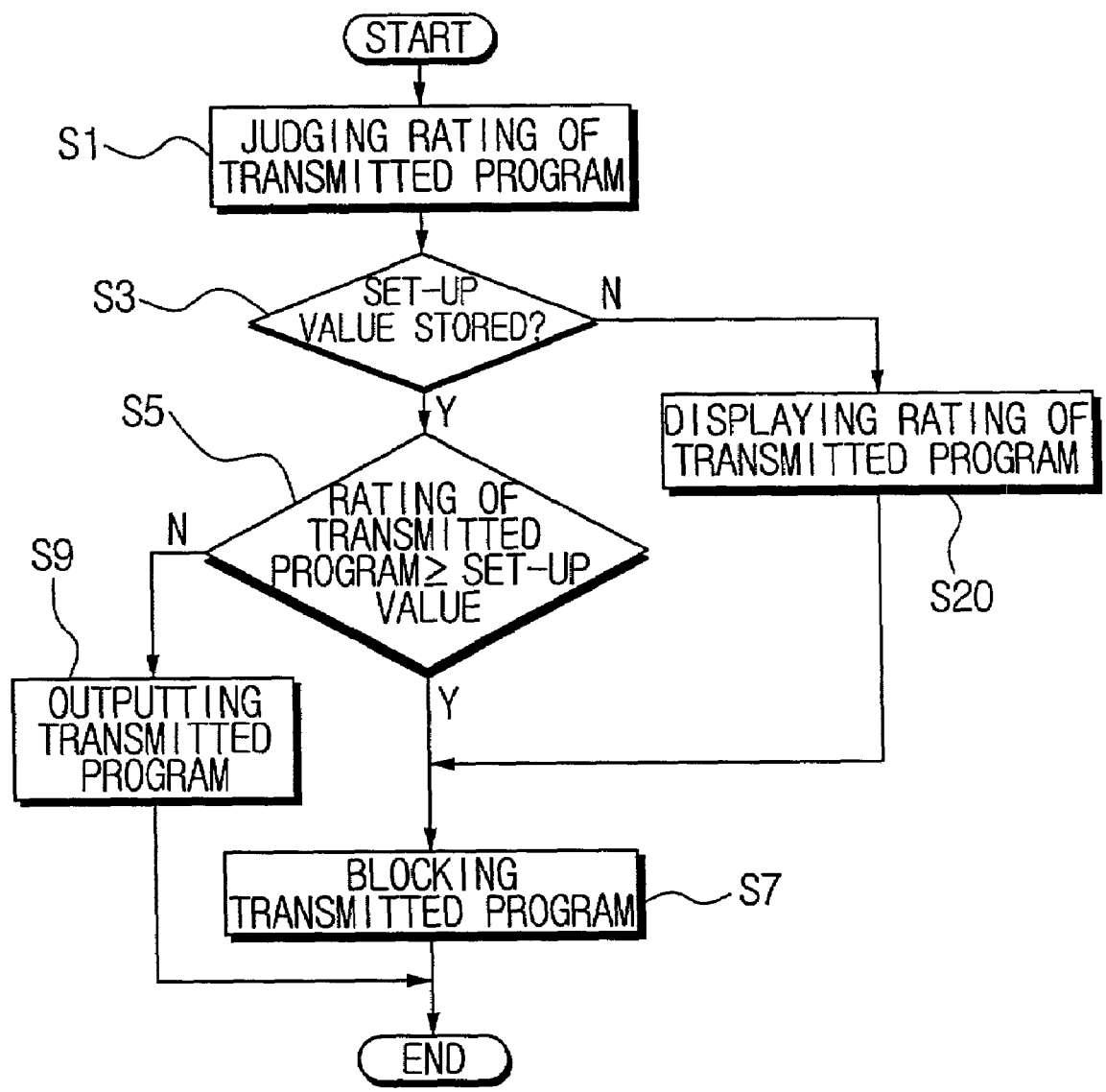
FIG. 3 is a flow chart showing a method for notifying of the existence of a restriction function according to the present invention.

Hereinbelow, a method for notifying the existence of a program rating function of the television according to the first preferred embodiment of the present invention will be described referring to FIG. 3.

First of all, when the television is turned on, a predetermined broadcasting signal is received through the input channel selection signal, and the rating is judged based on the program rating signal included in the broadcasting signal (S1). As an example, 'TV-PG' (a program for which parental guidance is required) is used for the received program rating. After that, the control unit 160 judges whether there is a set-up value of the program rating (S3). When a set-up value of the program rating exists, for example, if the set-up value is 'TV-G' (a program suitable to most audience), the control unit 160 compares the received program rating 'TV-PG' and the set-up value of the program rating 'TV-G' (S5). At this time, the received program rating 'TV-PG' is lower than the set-up value of the program rating 'TV-G', thus the received program is blocked (S7).

When the received program rating is 'TV-Y7' (a program suitable to children over 7), the set-up value of the program rating 'TV-G' is lower than the received program rating 'TV-Y7'. Thus, the program is broadcasted (S9). In other words, all programs having the program rating lower than the set-up value of the program rating are blocked.

Figure 4:
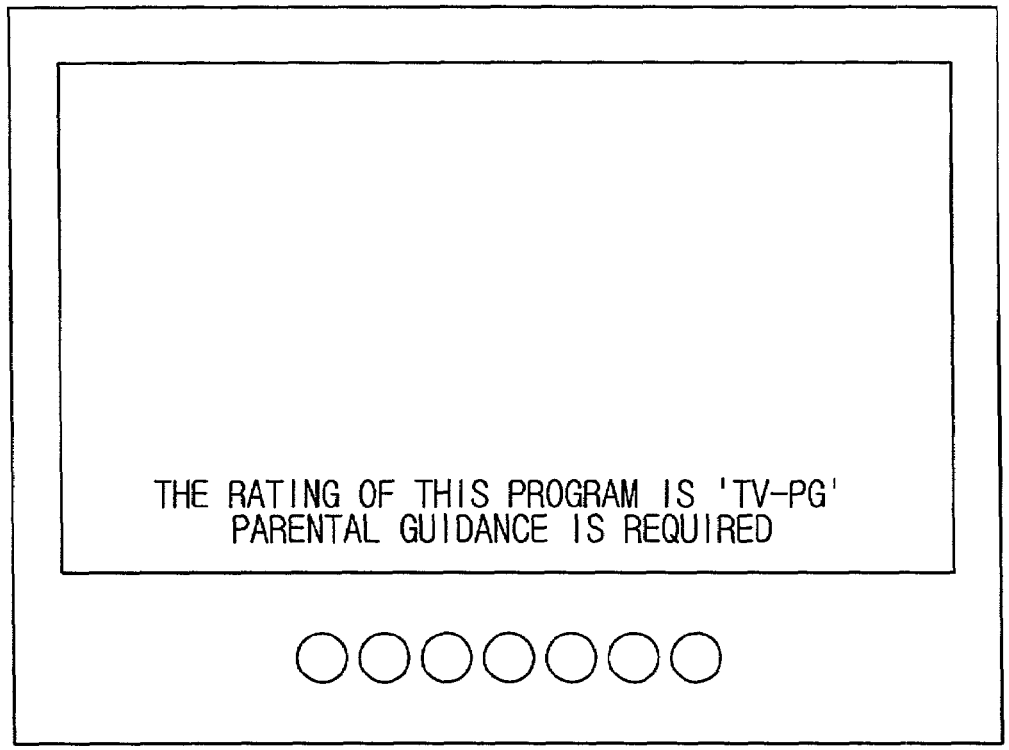
FIG. 4 is a view showing one example of the program rating displayed on a screen of the television according to the first preferred embodiment of the present invention.

When the control unit 160 judges that there is no set-up value of the program rating (S3), the rating of the program rating signal included in the received broadcasting signals is displayed as the OSD/OSG screen on the CRT 190 or audibly indicated through the speaker 180 (S20). At this time, it is preferable that the display is operated repeatedly at predetermined temporal intervals. For example, when the received program rating is 'TV-PG', the program rating is displayed on the screen at predetermined temporal intervals from the start of the program, or through the speaker 180 by a predetermined sound. When the program rating is displayed on the screen, the temporal interval can be 30 minutes and the period of display can be five seconds. The rating is displayed as the OSD/OSG screen as shown in FIG. 4, or the rating can be displayed with various methods, positions, sizes and types.

Therefore, the user can be informed of the rating and the harmfulness of the program being broadcasted.

Figure 5:
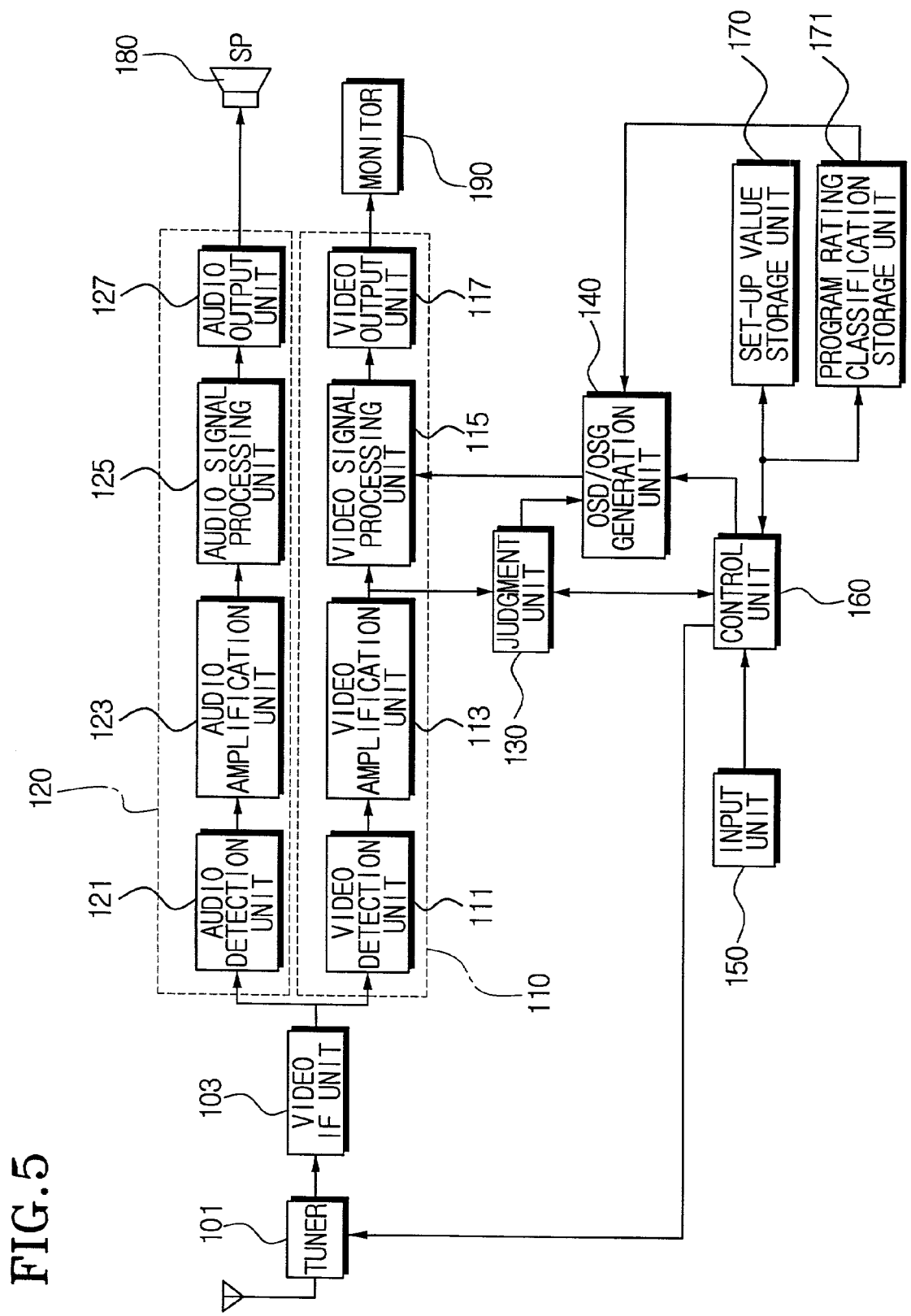
FIG. 5 is a block diagram showing a structure of the television of the second preferred embodiment of the present invention.

Hereinbelow, the second preferred embodiment of the present invention will be described referring to FIG. 5. In the second preferred embodiment of the present invention, the television has a program rating classification storage unit 171. Other elements are the same as the first preferred embodiment of the present invention shown in FIG. 1. The program rating classification storage unit 171 stores a general program rating classification of the television programs shown in FIG. 2.

When there is no set-up value of the program rating stored in the set-up value storage unit 170, the control unit 160 outputs the program rating judged at the judgment unit 130 and the general program rating classification of the program rating classification storage unit 171 to the OSD/OSG generation unit 140. Then, the OSD/OSG generation unit 140 converts the judged program rating and the program rating classification to the OSD/OSG screen and outputs the OSD/OSG screen to the video signal processing unit 115. The video signal process unit 115 outputs the program rating and the general program rating classification after processing the program rating converted in the OSD/OSG generation unit 140 and the general program rating classification with the processed composite video signal. At this time, the control unit 160 controls the judged program rating and the program rating classification to be displayed on the CRT 190 as the OSD/OSG screen at the predetermined temporal intervals.

The rest of the operation of the second preferred embodiment of the present invention is the same as the first preferred embodiment, thus the description will be omitted here.

In the meantime, referring to FIG. 3, the notification method of the second preferred embodiment is as follows.

Figure 6:
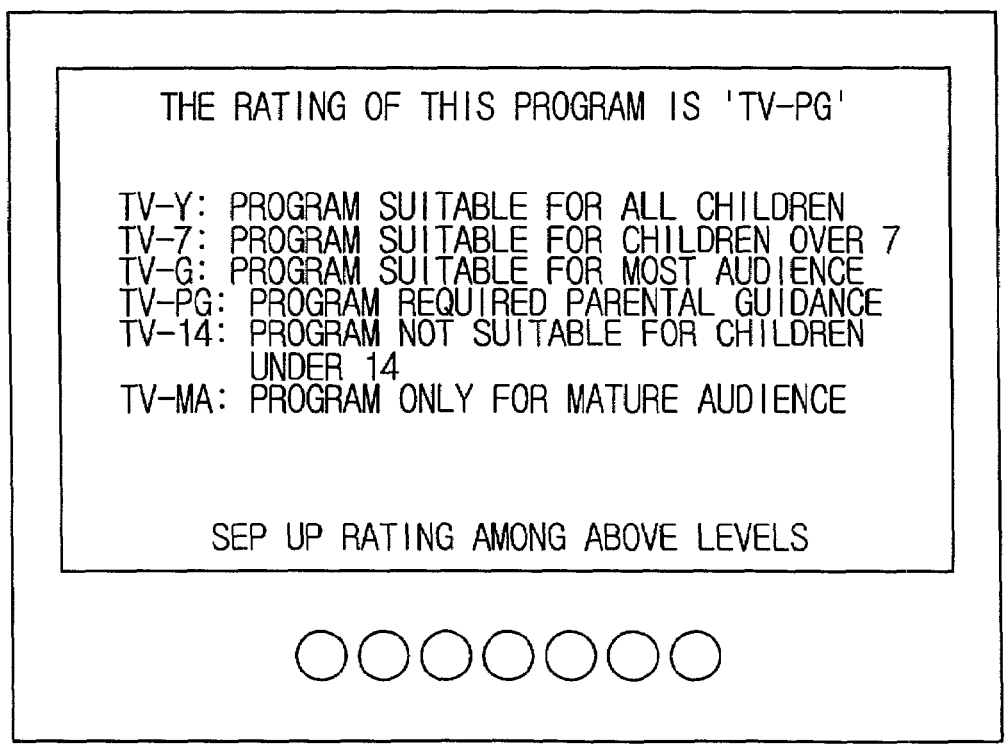
FIG. 6 is a view showing one example of the program rating displayed on a screen of the television according to the second preferred embodiment of the present invention.

When there is no set-up value of the program rating (S3), the rating of the received program and the general program rating classification is displayed on the CRT 190 as the OSD/OSG screen at the predetermined temporal intervals (S20). Accordingly, as shown in FIG. 6, since the program rating of the television program being broadcasted and the general program rating classification is repeatedly displayed on the screen as the OSD/OSG screen at the predetermined temporal interval, in other words, for five seconds in every 30 minutes. The user is reminded to set a set-up value of the program rating he/she wants.

According to the method for notifying of the existence of a program rating function described so far, the rating of the program being broadcasted and the general program rating classification are reported through a predetermined display unit, thus the practical usage of the television having the program rating function can be improved.

Furthermore, according to the present invention, the television includes a function of reporting that the television has a program rating and notification method, thus the programs can be watched by the audience after being rated, when the user does not set up the set-up value of the program rating and there is no restriction for some segments of the audience from watching harmful programs.

Although the preferred embodiments of the present invention have been described, it will be understood by those skilled in the art that the present invention should not be limited to the described preferred embodiments, but various changes and modifications can be made within the spirit and the scope of the present invention. Accordingly, the scope of the present invention is not limited within the described range but the following claims.

What is claimed is:

1. A television, comprising:
    a judgment unit for judging a program rating based on a program rating signal included in a received broadcasting signal for a program;
    a set-up value storage unit for storing a set-up value of a program rating set up by a user;
    a reporting unit for reporting the program rating judged by the judgment unit; and
    a control unit for controlling the reporting unit to report the program rating judged by the judgment unit,
    wherein the control unit determines if any set-up value of the program rating has been set up by the user, and controls the reporting unit to report the program rating only if it is determined that no set-up value has ever been set up in the set-up value storage unit,
    wherein the control unit controls the reporting unit to report the program rating for the program repeatedly at predetermined temporal intervals upon determining that that no set-up value has ever been set up in the set-up value storage unit, and
    wherein when the control unit determines that a set-up value is set up in the set-up value storage unit, the reporting unit does not report the program rating judged by the judgment unit and blocks the broadcasting signal whose program rating is judged by the judgment unit to be greater than or equal to the stored set-up value, and passing the broadcasting signal whose program rating is judged by the judgment unit to be less than the stored set-up value.

2. The television according to claim 1, wherein the reporting unit includes an OSD/OSG (on-screen display/on-screen graphics) generation unit for displaying the program rating as an OSD/OSG screen on a CRT.

3. The television according to claim 1, wherein the reporting unit is a speaker for audibly reporting the program rating.

4. The television according to claim 1, further comprising a program rating classification storage unit for storing a general program rating classification of the broadcasting signal,
    wherein the control unit controls the reporting unit to display the general program rating classification stored in the general program rating classification storage unit on a screen with the reporting of the program rating judged by the judgment unit only when no set-up value has ever been set up in the set-up value storage unit,
    wherein the reporting unit does not display the general program rating classification stored in the general program rating classification storage unit when a set-up value is set up in the set-up value storage unit.

5. A method for reporting an existence of a function in a television to restrict displaying a specific program, the method comprising the steps of:
    judging by a judgment device, a program rating based on a program rating signal included in a received broadcast for a program;
    storing in a set-up value storage device, a set-up value of a program rating set up by a user;
    reporting by a reporting device, the program rating judged by the judgment unit; and
    determining by a control device, if any set-up value of the program rating has been set up by the user, and wherein the program rating is reported by the reporting device only if it is determined that no set-up value has ever been set up in the set-up value storage device,
    wherein the program rating is reported by the reporting device repeatedly at predetermined temporal intervals upon a determination by the control device that no set-up value has ever been set up in the set-up value storage device, and
    wherein when the control device determines that a set-up value is set-up in the set-up value storage device, the program rating judged by the judgment device is not reported by the reporting device, and the broadcasting signal whose program rating is judged by the judgment device to be greater than or equal to the stored set-up value is blocked, and a broadcasting signal whose program rating is judged by the judgment device to be less than the stored set-up value is passed.

6. The method for reporting the existence of a function in a television to restrict displaying a specific program according to claim 5, wherein the program rating is displayed through an OSD/OSG screen in the reporting step.

7. The method for reporting the existence of a function in a television to restrict displaying a specific program according to claim 5, wherein the program rating is audibly reported in the reporting step.

8. The method for reporting the existence of a function in a television to restrict displaying a specific program according to claim 5,
  wherein a general program rating classification, stored in a general program rating classification storage device, is displayed on a screen with the reporting of the program rating judged by the judgment unit device when the control device determines that no set-up value has ever been set up in the set-up value storage device,
  wherein the general program rating classification is not displayed when the control device determines that a set-up value is set up in the set-up value storage device.

* * * * *